United States Patent
Iovieno et al.

(10) Patent No.: US 8,274,932 B2
(45) Date of Patent: Sep. 25, 2012

(54) LI REPORTING OF UPDATED LOCATION INFORMATION FOR EPS

(75) Inventors: Maurizio Iovieno, Mercato San Severino (IT); Elvira Villani, Salerno (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 300 days.

(21) Appl. No.: 12/714,690

(22) Filed: Mar. 1, 2010

(65) Prior Publication Data

US 2011/0096669 A1  Apr. 28, 2011

(30) Foreign Application Priority Data

Oct. 23, 2009  (WO) ................ PCT/SE2009/051217

(51) Int. Cl.
*H04W 4/00* (2009.01)
*H04L 12/28* (2006.01)
*H04W 24/00* (2009.01)

(52) U.S. Cl. .................. 370/328; 370/254; 455/456.1
(58) Field of Classification Search .......... None
See application file for complete search history.

(56) References Cited

U.S. PATENT DOCUMENTS

| | | | |
|---|---|---|---|
| 7,966,023 B2 * | 6/2011 | Fiorillo et al. ............ 455/456.3 |
| 2009/0047951 A1 * | 2/2009 | Yeoum et al. ............ 455/435.1 |
| 2009/0213762 A1 * | 8/2009 | Guo et al. .................... 370/254 |
| 2010/0260141 A1 * | 10/2010 | Chowdhury et al. ......... 370/331 |
| 2010/0331011 A1 * | 12/2010 | Vikberg et al. ............ 455/456.1 |
| 2011/0013528 A1 * | 1/2011 | Chen .............................. 370/252 |
| 2011/0069664 A1 * | 3/2011 | Yin et al. ....................... 370/328 |
| 2011/0261715 A1 * | 10/2011 | Norefors et al. ............. 370/252 |
| 2011/0306321 A1 * | 12/2011 | Keller et al. .................. 455/411 |

FOREIGN PATENT DOCUMENTS

WO  WO 2006/011165 A1  2/2006

OTHER PUBLICATIONS

3GPP. 3rd Generation Partnership Project; Technical Specification Group Services and System Aspects; 3G security; Lawful interception architecture and functions (Release 8) 33.107 v8.9.1. (Oct. 2009).

* cited by examiner

*Primary Examiner* — Clemence Han (57) ABSTRACT

The present invention relates to a method to enhance resolution of location information of a mobile user in an Evolved Packet communication System. The system comprises a Mobility Management Entity that provides the user with at least one tracking area in which the user is able to move without location information being reported, The method comprises the following steps:
- receiving to the Mobility Management Entity, a location activation message valid for the user.
- receiving to the Mobility Management Entity, a service request related to the user;
- detecting in the Mobility Management Entity, user location information with higher resolution than the at least one tracking area level resolution;
- sending from the Mobility Management Entity, a monitoring message comprising high resolution information of the user's location within the at least one tracking area.

20 Claims, 6 Drawing Sheets

LI REPORTING OF UPDATED LOCATION INFORMATION FOR EPS

TECHNICAL FIELD

The present invention relates to enhance resolution of location information of a mobile user in an Evolved Packet communication System.

BACKGROUND

In case Lawful Interception is active on a target subscriber or in case of Data Retention, it is a requirement for the Operator to provide location information available in the network as part of Intercept Related Information/Retained Data. In case the target subscriber is attached to an Evolved Packet System EPS through 3GPP access [3GPP TS 23.401, "General Packet Radio Service (GPRS) enhancements for Evolved Universal Terrestrial Radio Access Network (E-UTRAN) access"], a Mobility Management Entity MME node is the node of the Evolved Packet Core which is the most location aware in the network. 3GPP LI Technical Specifications ([3GPP TS 33.107, "3G Security; Lawful Interception architecture and functions"], [3GPP TS 33.108, "3G Security; Handover interface for Lawful Interception (LI)"]) specify the LI architecture for 3GPP systems, including the EPS. According to [3GPP TS 33.107, "3G Security; Lawful Interception architecture and functions"], in case LI is activated for a target subscriber, the MME is required to report the following LI events, each one being related to a network procedure involving the target subscriber, to the Delivery Function DF2 (described below), including location information:

Attach
Detach
Tracking Area Update (TAU)
UE initiated PDN connectivity
UE initiated PDN disconnection These procedures may trigger one or several EPS bearer procedures: in such case, a Serving Gateway S-GW and a Packet Data Network Gateway PDN-GW are required to report the related signaling and, if required by the LI warrant, the Content of the Communication.

When the subscriber successfully attaches to the EPS network, the MME provides the User Equipment UE with a "Tracking Area List" which includes one or more Tracking Areas. When the UE moves inside the Tracking Area list, no Tracking Area Update TAU procedure is started by the UE.

In addition, when the UE successfully attaches to the EPS network, a default bearer is activated and, as part of the signaling, the PDN-GW may require (through the S-GW) the MME to report change of location for the involved subscriber. When this happens for a specific subscriber, each time that the MME detects a change of location due to a Tracking Area Update or any other network procedure involving the subscriber, the updated location is reported to the PDN-GW through the S-GW. This function, which is called MS Info Change Reporting ([3GPP TS 23.401, "General Packet Radio Service (GPRS) enhancements for Evolved Universal Terrestrial Radio Access Network (E-UTRAN) access"], [3GPP TS 23.060, "General Packet Radio (GPRS); Service description"]), may be used e.g. for Location Dependent Charging.

Figure 1A:
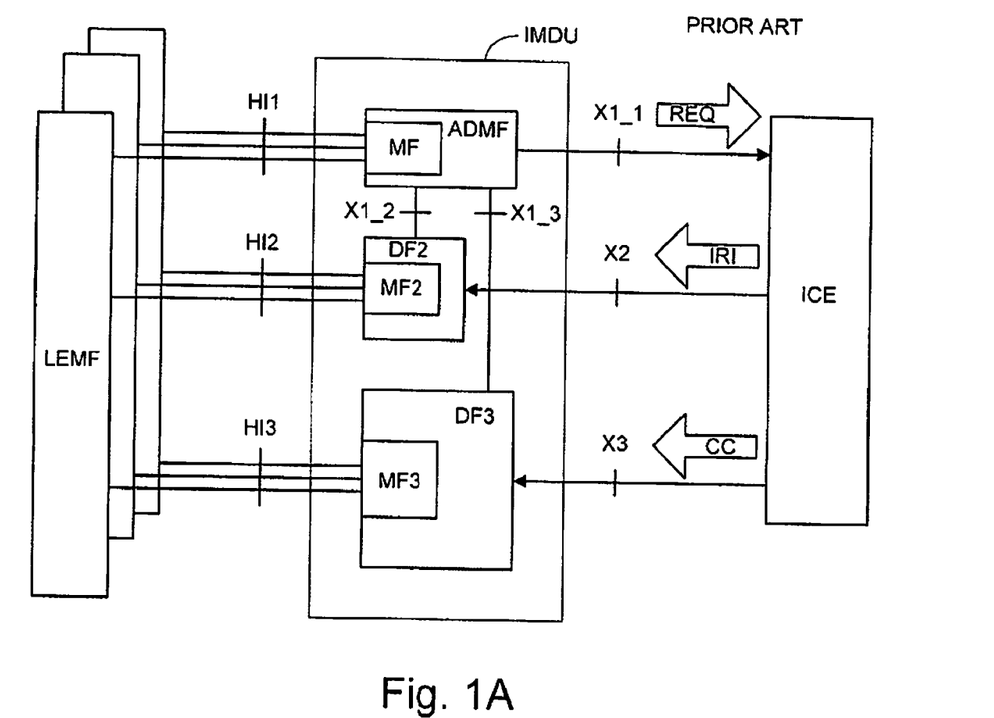
FIG. 1A is part of the prior art and discloses a block schematic illustration of an Intercept Mediation and Delivery Unit attached to an Intercepting Control Element.
Figure 1B:
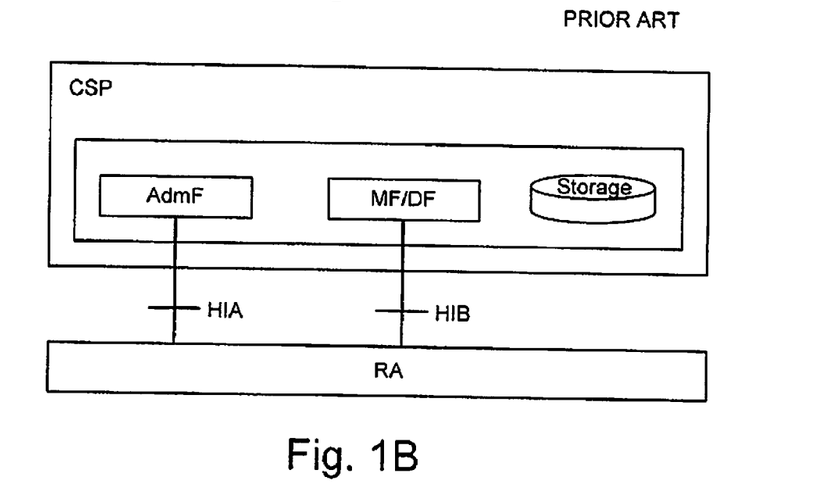
FIG. 1B is part of the prior art and discloses a block schematic illustration of a Data Retention System attached to a Requesting Authority.

FIG. 1A is part of the prior art and discloses an Intercept Mediation and Delivery Unit IMDU, also called Intercept Unit. The IMDU is a solution for monitoring of Interception Related Information IRI and Content of Communication CC for the same target. The different parts used for interception are disclosed in current Lawful Interception standards (see 3GPP TS 33.108 and 3GPP TS 33.107—Release 8). A Law Enforcement Monitoring Facility LEMF is connected to three Mediation Functions MF, MF2 and MF3 respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected via interfaces X1-X3 to an Intercepting Control Element ICE in a telecommunication system. Together with the delivery functions, the ADMF is used to hide from ICEs that there might be multiple activations by different Law Enforcement Agencies. Messages REQ sent from LEMF to ADMF via HI1 and from the ADMF to the network via the X1_1 interface comprise identities of a target that is to be monitored. The Delivery Function DF2 receives Intercept Related Information IRI from the network via the X2 interface. DF2 is used to distribute the IRI to relevant Law Enforcement Agencies LEAs via the HI2 interface. The Delivery Function DF3 receives Content of Communication CC, i.e. speech and data, on X3 from the ICE. Requests are also sent from the ADMF to the Mediation Function MF2 in the DF2 on an interface X1_2 and to the Mediation Function MF3 in the DF3 on an interface X1_3. The requests sent on X1_3 are used for activation of Content of Communication, and to specify detailed handling options for intercepted CC. In Circuit Switching, DF3 is responsible for call control signaling and bearer transport for an intercepted product. Intercept Related Information IRI, received by DF2 is triggered by Events that in Circuit Switching domain are either call related or non-call related. In Packet Switching domain and Evolved Packet Switching domain the events are session related or session unrelated. While Lawful Interception is a real-time exercise, data from the past is used when Data Retention is practiced. FIG. 1B belongs to the prior art and shows the Handover Interfaces between a Data Retention System DRS (see ETSI DTS/LI-00033 V0.8.1 and ETSI DTS/LI-0039) at a Communication Service Provider CSP, and a Requesting Authority RA. The figure shows an Administration Function AdmF used to handle and forward requests from/to the RA. A Mediation and Delivery function MF/DF is used to mediate and deliver requested information. Storage is used to collect and retain all possible data from external data bases. The generic Handover Interface adopts a two port structure such that administrative request/response information and Retained Data Information are logically separated. The Handover Interface port 1 HIA transports various kinds of administrative, request and response information from/to the Requesting Authority and the organization at the CSP which is responsible for Retained Data matters. The HIA interface may be crossing borders between countries. This possibility is subject to corresponding national law and/or international agreements. The Handover Interface port 2 HIB transports the retained data information from the CSP, to the Requesting Authority. The individual retained data parameters have to be sent to the Requesting Authority at least once (if available). The HIB interface may be crossing borders between countries. This possibility is subject to corresponding national law and/or international agreements.

For a UE successfully attached to the Evolved Packet System EPS, the Tracking Area Update procedure is triggered only in case the UE moves outside the Tracking Area List. While this saves signaling in the network, in case of a Lawfully Intercepted target, after the attach procedure, the location is not reported to the LEMF until the next Tracking Area Update occurs, implying that the location can be considered known at the LEMF only at Tracking Area List level, i.e. with lower resolution than e.g. Cell identity.

The already existing MS Info Change Reporting procedure, which would allow the network nodes to provide more accurate location information in case of LI via Bearer modification procedure, is demanding from signaling point of view as it introduces additional signaling in the network and, unless already active for other reasons (e.g. location dependent charging), is not suitable to be activated generally (for all subscribers) for LI purposes, considering that normally only a few percentage of subscribers are target for interception. On the other side, invocation of this procedure only for subscribers who are targets for LI would introduce specific LI signaling in the network, which may allow detection of ongoing LI for specific subscribers.

SUMMARY

An aim of the invention is to overcome above identified limitations of the prior art. The invention focuses on requiring a Mobility Management Entity MME to generate a monitoring event each time that a Service Request procedure is detected by the MME node. The monitoring event would include updated high resolution location information available at the MME as part of the procedure.

The solution more in detail is a method to enhance resolution of location information of a mobile user in an Evolved Packet communication System. The system comprises a Mobility Management Entity that is responsible for providing the user with for example a tracking list that informs of at least one tracking area in which the user is able to move without location information being reported. The method comprises the following steps:

- A location activation message valid for the user is received to the Mobility Management Entity.
- A service request related to the user is received to the Mobility Management Entity.
- User location information with higher resolution than the at least one tracking area level resolution is detected in the Mobility Management Entity.
- A monitoring message that comprises high resolution information of the user's location within the at least one tracking area is delivered from the Mobility Management Entity.

According to one exemplary embodiment a system and a method for lawfully intercepting high resolution information of a user's location is disclosed. A service request that evokes the desired information is in this embodiment triggered by the user.

According to another exemplary embodiment a system and a method for lawfully intercepting high resolution information of a user's location is disclosed. A service request that evokes the desired information is triggered by the Evolved Packet communication System.

According to yet another exemplary embodiment, an Automatic Data retention system is disclosed that retain desired information that is triggered by the user and/or the Evolved Packet communication System.

An object of the invention is facilitating high resolution location information valid for a user. This object and others are achieved by systems, methods, arrangements and nodes.

Some advantages of the invention are that the invention allows the operator to have enhanced compliance to regulatory requirements on provision of location information available in the network that the invention allows to have more accurate location information for Lawful Interception and that allows enhancing the LI solution provided for Evolved Packet System.

The invention will now be described more in detail with the aid of preferred embodiments in connection with the enclosed drawings.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Long Term Evolution LTE is advancement to current mobile telecommunications networks, designed to significantly improve data rates. System Architecture Evolution SAE is the core network architecture of 3GPP's future LTE wireless communication standard. The main component of the SAE architecture is the Evolved Packet Core EPC that is a part of an Evolved Packet System EPS. The EPC will serve as equivalent of GPRS networks via a Mobility Management Entity MME, a Serving Gateway S-GW and a Packet Data Network Gateway PDN-GW.

Figure 2:
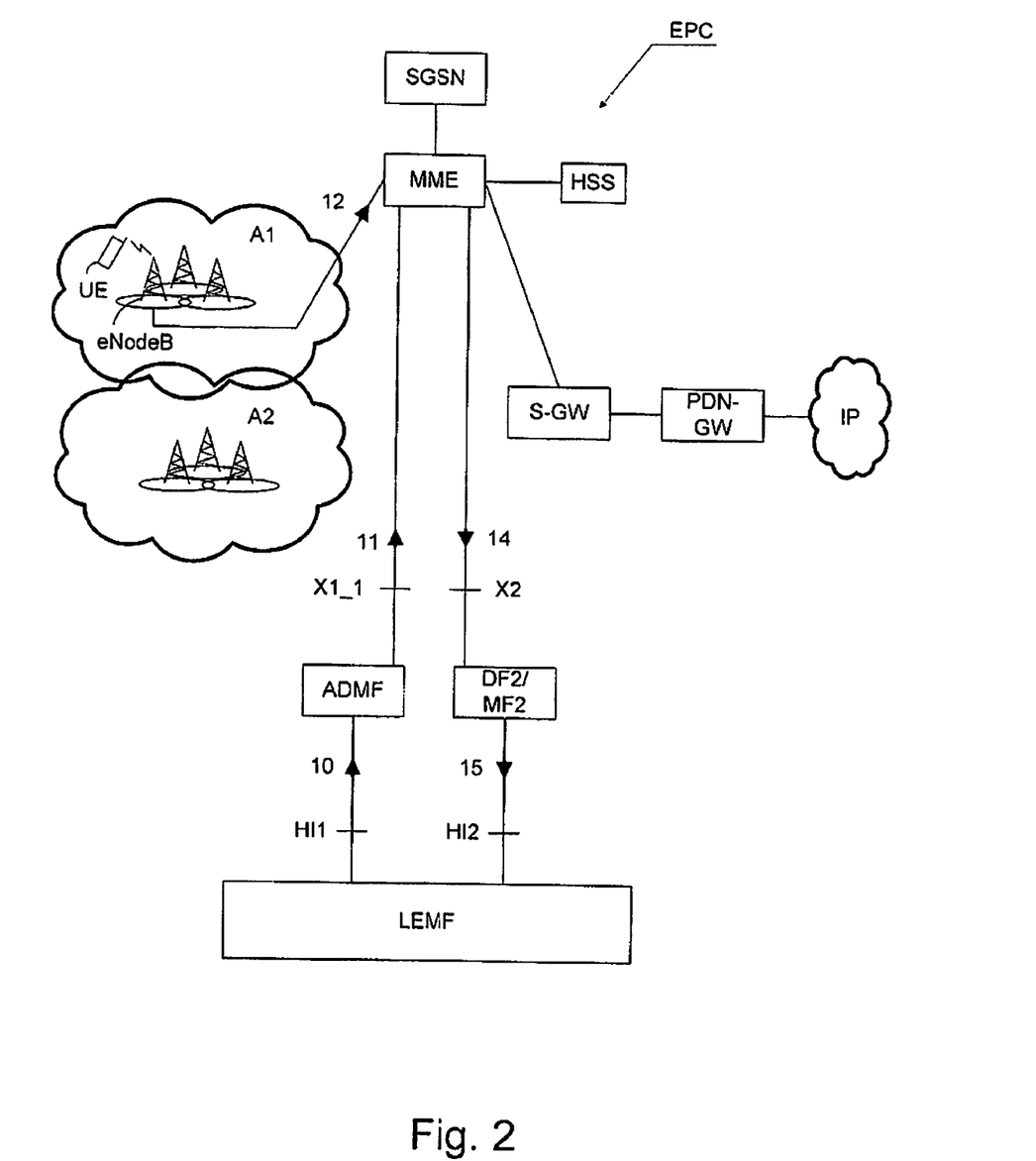
FIG. 2 is a block schematic illustration of an Evolved Packet communication System wherein monitoring information is triggered by a user and sent to a Lawful Interception system.

FIG. 2 discloses the Packet Data Network Gateway PDN-GW attached to the Serving Gateway S-GW that in turn is attached to the Mobility Management Entity MME. These entities have all been briefly mentioned in the background part of this application.

The PDN-GW in FIG. 2 provides connectivity from a User Equipments UE to external packet data networks IP by being the point of exit and entry of traffic for the UE. The PDN-GW performs policy enforcement, packet filtering for each user, charging support, lawful Interception and packet screening.

The Serving Gateway S-GW routes and forwards user data packets, while also acting as the mobility anchor for the user plane during inter-eNodeB handovers and as the anchor for mobility between Long Term Evolution LTE and other 3GPP technologies (terminating S4 interface and relaying the traffic between 2G/3G systems and PDN-GW). It also performs replication of the user traffic in case of lawful interception.

The MME is the key control-node for the Long Term Evolution LTE access-network. It is responsible for idle mode User Equipment UE tracking and paging procedure including retransmissions. It is involved in the bearer activation/deactivation process and is also responsible for choosing the S-GW for a UE at the initial attach and at time of intra-LTE handover involving Core Network node relocation. It is responsible for authenticating the user (by interacting with the Home Subscriber Server HSS). Lawful interception of signaling is supported by the MME.

A Serving GPRS Support Node SGSN as well as a Home Subscriber Server HSS is attached to the MME in FIG. 2. User equipment UE is communicating via a base station eNodeB located within a first tracking area A1. FIG. 2 also shows a second tracking area A2. The tracking areas will be further explained together with FIG. 3. A Lawful Interception LI system is attached to the Mobility Management Entity MME. The LI system comprises the, in FIG. 1A already explained, LEMF, HI1, HI2, ADMF, DF2/MF2, X1_1 and X2. The signaling 10,11,12,14 and 15 that can be seen in FIG. 2 will be explained more in detail in FIG. 3.

Figure 3:
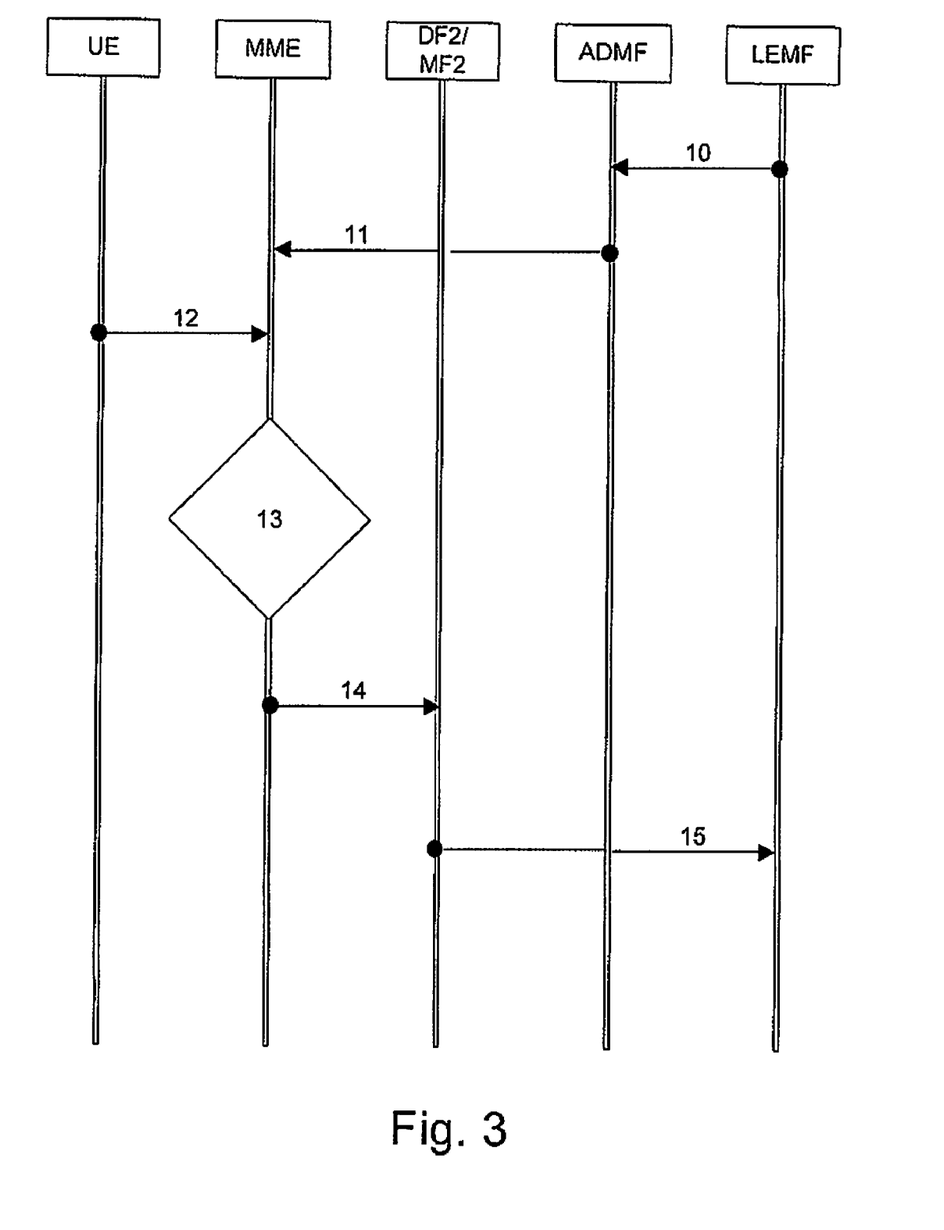
FIG. 3 discloses a signal sequence diagram representing a method to monitor high resolution location information by utilizing the system configuration disclosed in FIG. 2.

A method according to a first embodiment of the invention will now be explained together with FIG. 3. Signaling points UE, MME, DF2/MF2, ADMF and LEMF have all been shown and explained in the FIGS. 1A and 2. The method will show a "User Equipment UE triggered service request procedure" that will result in that an enhanced resolution of location information of a mobile user UE is sent to the Law Enforcement Monitoring Facility LEMF. In the explanation of this service request procedure notice has been taken in FIG. 3, only to those steps that are of particular interest for the invention. A more complete explanation of the UE triggered procedure can be seen in "3GPP TS 23.401 v8.7.0 (2009-09) ", for example on page 82. The method according to the first embodiment comprises the following steps:

An agency activates Lawful Interception of a target, i.e. of User Equipment UE attached to the Evolved Packet Core EPC, requiring also location information to be reported, by an activation message 10,11, according to the prior art. The target subscriber attaches to the Evolved Packet System EPS through 3GPP access and the MME node is hereby the node in the Evolved Packet Core EPC which is the most location aware in the network. When the User Equipment successfully attaches to the EPS network the MME provides according to prior art the UE with a "Tracking Area list" which includes one or more Tracking Areas A1, A2. As was seen in FIG. 2, the user is located within the first tracking area A1 and is communicating via the eNodeB. In case Lawful Interception is active for the UE, the MME according to prior art is required to report Tracking Area Update TAU but will not perform tracking Area Update when the user equipment moves inside tracking areas defined in the area list. The agency in this example requires according to the invention location information with enhanced resolution beyond the Tracking Area Update (TAU) location information.

The User Equipment UE sends a Non-Access Stratum NAS message Service Request 12 (S-TMSI, Service Type) towards the MME. The request is sent to the eNodeB that forwards the NAS message to MME. A more detailed explanation of this can be seen in 3GPP TS 23.401 v8.7.0 (2009-09).

Upon receiving the Non-Access Stratum NAS message Service Request 12, the MME detects 13 user location information with high resolution i.e. information that comprises the user's location with higher resolution than TAI list/TA. To be noted is that E-CGI i.e. the "high resolution location" is already provided in prior art in the other events intercepted by the MME (e.g. Attach). According to the invention the NAS service request is an additional event at the MME to have fresher location information on cell level.

It is verified in the MME that Lawful Interception is activated for the user equipment UE.

According to the invention, the high resolution information message of the user's location within the tracking area list/tracking area is sent 14,15 towards the Law Enforcement Monitoring Facility LEMF. The resolution information message is hereby sent 14 from the MME to the DF2/MF2 on the X2 interface and sent 15 from the DF2/MF2 to the LEMF on the interface HI2.

Figure 4:
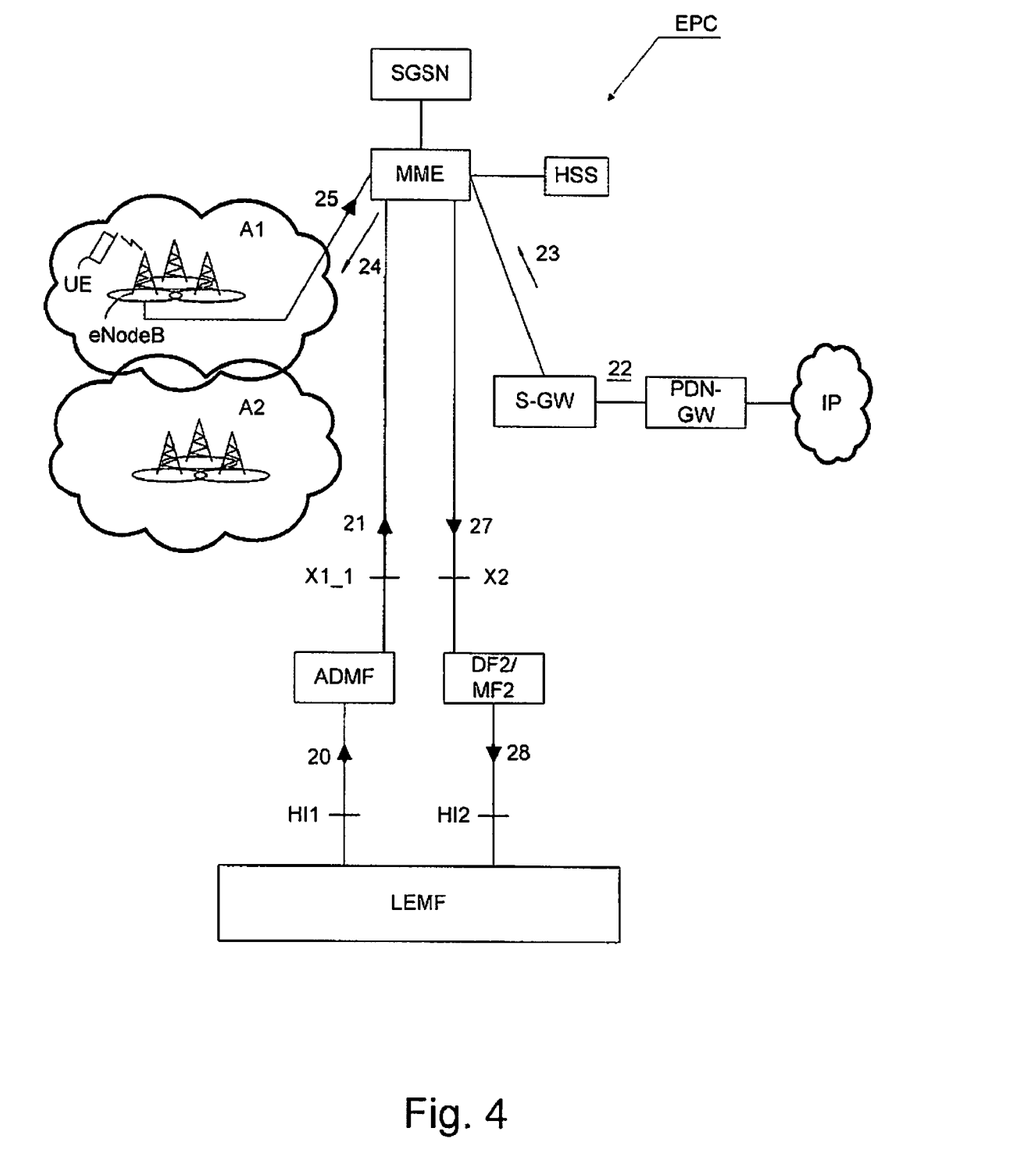
FIG. 4 is a block schematic illustration of an Evolved Packet communication System, wherein monitoring information is triggered by the Evolved Packet communication System and sent to a Lawful Interception system.

FIG. 4 discloses the same system configuration as the one that was disclosed in FIG. 2. The different entities have all been explained together with FIG. 2. The signaling 20,21,22, 23, 24, 25, 27 and 28 that can be seen in FIG. 4 will be explained more in detail in FIG. 5.

Figure 5:
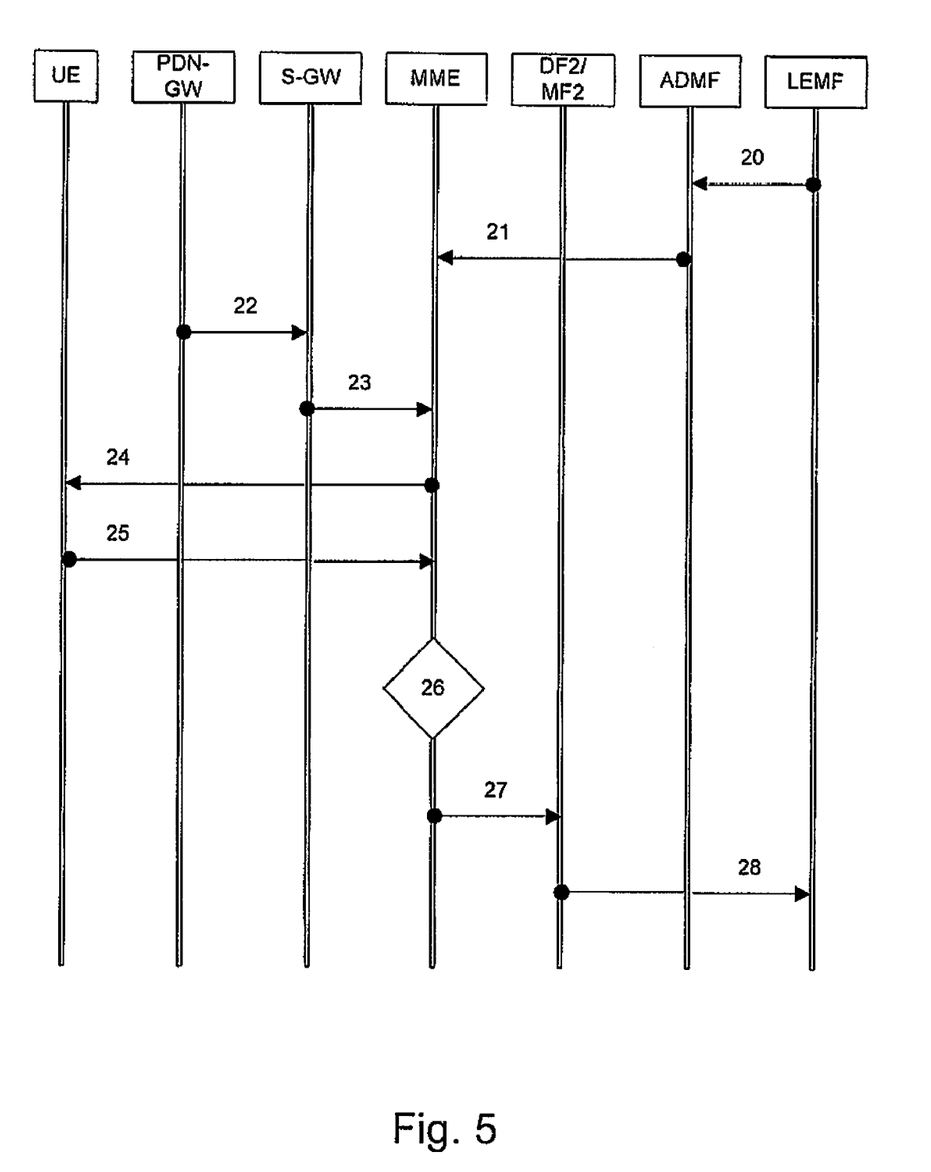
FIG. 5 discloses a signal sequence diagram representing a method to monitor high resolution location information by utilizing the system configuration disclosed in FIG. 4.

A method according to a second embodiment of the invention will now be explained together with FIG. 5. Signaling points UE, PDN-GW, S-GW, MME, DF2/MF2, ADMF and LEMF have all been shown and explained in the FIGS. 1A and 2. The method will show a "Network triggered service request procedure" that will result in that an enhanced resolution of location information of a mobile user UE is sent to the Law Enforcement Monitoring Facility LEMF. In the explanation of this service request procedure, notice has been taken in FIG. 5, only to those steps that are of particular interest for the invention. A more complete explanation of the Network triggered procedure can be seen in "3GPP TS 23.401 v8.7.0 (2009-09)", for example on page 67. The method according to the second embodiment comprises the following steps:

An agency activates Lawful Interception of the user equipment UE attached to the Evolved Packet Core, requiring also location information to be reported, by an activation message 20,21, according to the prior art. The activation message 20,21 is hereby sent from the Law Enforcement Monitoring Facility LEMF to the Mobility Management Entity MME. The location activation message is sent 20 from the LEMF to the ADMF on the interface HI1 and sent 21 from the ADMF to the MME on the interface X1_1.

The Packet Data Network Gateway PDN-GW receives in this example a downlink data packet for the User Equipment UE, see "3GPP TS 23.401 v8.0.0 (2007-12)" for more details, and forwards 22 the data packet to the Serving Gateway S-GW.

After having received the data packet, the Serving Gateway S-GW sends 23 a Downlink Data Notification to the Mobility Management Entity MME.

The MME sends 24 a paging message to each eNodeB belonging to the tracking areas A1, A2 in which the User Equipment is registered. The UE is paged by the eNodeBs.

The User Equipment UE initiates a Service Request procedure by sending a NAS message Service Request 25 towards the MME.

Upon receiving the Non-Access Stratum NAS message Service Request 25, the MME detects 26 user location information with high resolution i.e. information that comprises the user's location with higher resolution than TAI list/TA.

It is verified in the MME that Lawful Interception is activated for the user equipment UE.

According to the invention, the high resolution information message of the user's location within the tracking area A1 is sent 27,28 towards the Law Enforcement Monitoring Facility LEMF. The resolution information message is hereby sent 27 from the MME to the DF2/MF2 on the X2 interface and sent 28 from the DF2/MF2 to the LEMF on the interface HI2.

To be noted is that the invention also covers cases and can be applied to other nodes than the MME for example if the same function is applied to a SGSN covering 2G/3G Radio Access Networks. To be noted is also that different accesses can be used (e.g. non 3GPP accesses).

As has been seen above the MME will send the new Lawful Interception event "Service Request" over the X2 interface. The event will carry the following information (Text format BOLD is used to highlight new values and relevant parameters):

---

Observed MSISDN
Observed IMSI
Observed ME Id
Event Type (=Service request)
Event Time
Event Date
Network Element Identifier (MME address)
Location Information(TAI + E-CGI)
Failed reason (in case of failure)
Interception Area (in case Location Dependent Interception is applicable)

---

Upon reception of the new event, the DF2/MF2 will send an IRI REPORT record over HI2 as below:

| Parameter | MOC | Description/Conditions |
|---|---|---|
| observed MSISDN<br>observed IMSI<br>observed ME Id | C | Provide at least one and others when available. |
| event type | C | Provide Service request event type. |
| event date<br>event time | M | Provide the date and time the event is detected. |
| network identifier | M | Shall be provided. |
| lawful intercept identifier | M | Shall be provided. |
| location information | C | Provide, when authorized, to identify location information for the intercept subject's UE. |
| failed reason | C | Provide information about the reason for failure of the service request procedure |

An Interception Related Information IRI report will then be coded in ASN.1 as specified in section B.9 of "3GPP TS 33.108 v.8.8.0, 3G Security; Handover interface for Lawful Interception (LI)", which will need to be enhanced in order to support the new event type (Text format BOLD is used to highlight, as an example, a possible new value for the parameter):

```
EPSEvent ::= ENUMERATED
{
    pDPContextActivation                        (1),
    startOfInterceptionWithPDPContextActive     (2),
    pDPContextDeactivation                      (4),
    gPRSAttach                                  (5),
    gPRSDetach                                  (6),
    locationInfoUpdate                          (10),
    sMS                                         (11),
    pDPContextModification                      (13),
    servingSystem                               (14),
    ...,
    startOfInterceptionWithMSAttached           (15),
    e-UTRANAttach                               (16),
    e-UTRANDetach                               (17),
    bearerActivation                            (18),
    startOfInterceptionWithActiveBearer         (19),
    bearerModification                          (20),
    bearerDeactivation                          (21),
    uERequestedBearerResourceModification       (22),
    uERequestedPDNConnectivity                  (23),
    uERequestedPDNDisconnection                 (24),
    trackingAreaUpdate                          (25),
    servingEvolvedPacketSystem                  (26),
    pMIPAttachTunnelActivation                  (27),
    pMIPAttachTunnelDeactivation                (28),
    startOfInterceptWithActivePMIPTunnel        (29),
    pMIPPdnGwInitiatedPdnDisconnection          (30),
    mIPRegistrationTunnelActivation             (31),
    mIPDeregistrationTunnelDeactivation         (32),
    startOfInterceptWithActiveMIPTunnel         (33),
    dSMIPRegistrationTunnelActivation           (34),
    dSMIPDeregistrationTunnelDeactivation       (35),
    startOfInterceptWithActiveDsmipTunnel       (36),
    dSMipHaSwitch                               (37),
    pMIPResourceAllocationDeactivation          (38),
    mIPResourceAllocationDeactivation           (39),
    serviceRequest                              (40)
}
```

Figure 6:
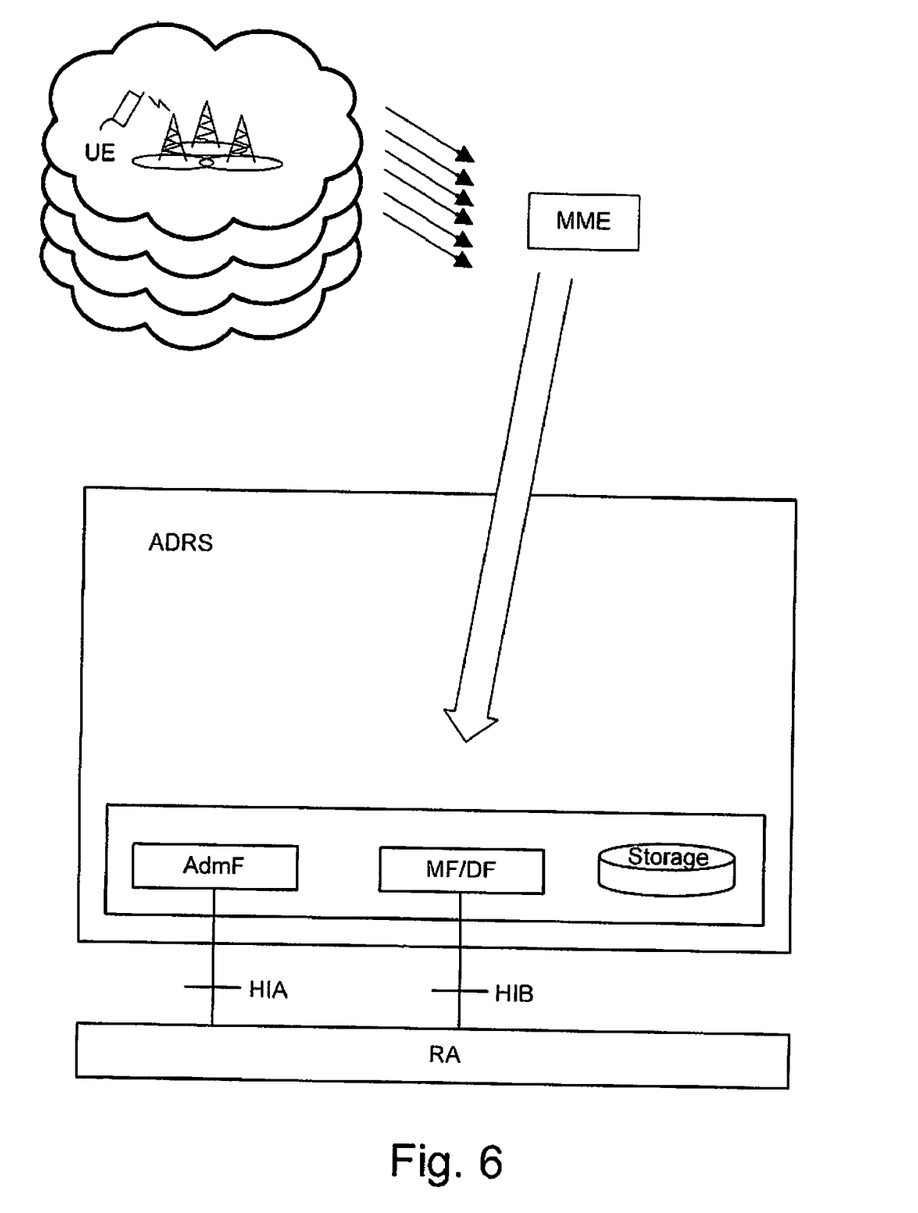
FIG. 6 is a block schematic illustration of an Evolved Packet communication System, wherein monitoring information is triggered by a user and/or the Evolved Packet communication System and sent to a Data Retention system.

FIG. 6 discloses in a third embodiment a Data Retention configuration. FIG. 6 shows the Handover Interfaces between an Automatic Data Retention System ADRS at a Communication Service Provider, and a Requesting Authority RA. This configuration including the AdmF, MF/DF, STORAGE, HIA, HIB and RA has been explained earlier in the background part of this application. The earlier explained Mobility Management Entity MME is in this embodiment acting as data retention source. The transportation of data from the MME to the MF/DF is schematically shown with a thick arrow in FIG. 6. Data records are transferred to the mediation function in the Data Retention System, and data fulfilling configured filtering criteria are mediated from MF/DF to the Storage. Updating of the Storage depends on the policy regulating the notifications with the user, session or operator related data, from the data retention sources towards the storage. Accordingly, the transportation of the data from the sources to the storage via the MF/DF is handled by an automatic data retention system. The transported data is user location information with high resolution that has been detected in the MME after either a User Equipment or a Network triggered service request procedure. The automatic data retention system is part of the prior art. The method in the third embodiment comprises the following steps:

A monitoring request regarding user location information with high resolution is determined by the requesting Authority RA and sent to the AdmF via the interface HIA.

The AdmF informs the Mediation and Delivery function MF/DF of the request.

The requested data is fetched by the Mediation and Delivery function MF/DF from the Storage.

The found data is sent as Message Data Records from the MF/DF on the interface HIB, to the RA.

The reciprocal signaling between the above different Data Retention entities is to be seen just as example. For example can the STORAGE be an integrated part of the MF/DF. In this example the criteria are sent from the RA but may also be communicated by an intermediary, such as a human operator who receives the command from an authorized source, and then inputs the criteria to the ADRS.

Items are shown in the figures as individual elements. In actual implementations of the invention however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

Individual function blocks are shown in one or more figures. Those skilled in the art will appreciate that functions may be implemented using discrete components or multi-function hardware. Processing functions may be implemented using a programmed microprocessor or general-purpose computer. The invention is in other words not limited to the above described and in the drawings shown embodiments but can be modified within the scope of the enclosed claims.

The invention claimed is:

1. A method to enhance resolution of location information of a mobile user in an Evolved Packet Communication System comprising a Mobility Management Entity that provides the mobile user with at least one tracking area in which the mobile user is able to move without location information being reported, which method comprises:
    receiving at the Mobility Management Entity, a location activation message valid for the mobile user;
    receiving at the Mobility Management Entity, a service request related to the mobile user;
    detecting in the Mobility Management Entity, user location information with higher resolution than at least one tracking area level resolution; and
    sending from the Mobility Management Entity, a monitoring message comprising high resolution information of the user's location within the at least one tracking area.

2. The method according to claim 1, which the service request is a Non-Access Stratum (NAS) message.

3. The method according to claim 1, which the service request is triggered by the mobile user.

4. The method according to claim 1, wherein a Serving Gateway in the Evolved Packet Communication System interconnects the Mobility Management Entity with a Packet Data Network Gateway, whereby the service request is triggered by the Packet Data Network Gateway.

5. The method according to claim 1, which the monitoring message is an Interception Related Information (IRI) Report.

6. The method according to claim 1, whereby a tracking area list comprising the at least one tracking area is received by the Mobility Management Entity.

7. The method according to claim 1, wherein the Evolved Packet Communication System further comprises a monitoring system that is attached to the Mobility Management Entity via at least one first interface and at least one second interface, wherein the location activation message is received from the monitoring system via the at least one first interface and the monitoring message is sent to the monitoring system via the at least one second interface.

8. The method according to claim 7, which the monitoring system is part of a Lawful Interception System.

9. The method according to claim 8, which the at least one second interface comprises an X2 transport interface and a Handover Interface 2 (HI2) over which an event type and location information or alternatively a failed reason is sent in case of failure is sent.

10. The method according to claim 7, which the monitoring system is part of a Data Retention System.

11. A node for enhancing resolution of location information of a mobile user in an Evolved Packet Communication System, which node provides the mobile user with at least one tracking area in which the mobile user is able to move without location information being reported, which node comprises:
    means to receive at the node, a location activation message valid for the mobile user;
    means to receive at the node, a service request related to the mobile user;
    means to detect in the node, user location information with higher resolution than at least one tracking area level resolution; and
    means to send from the node, a monitoring message comprising high resolution information of the user's location within the at least one tracking area.

12. The node according to claim 11, which the service request is a Non-Access Stratum (NAS) message.

13. The node according to claim 11, wherein the Evolved Packet Communication System further comprises a monitoring system that is attached to the node via at least one first interface and at least one second interface.

14. The node according to claim 13, which the monitoring system is part of a Lawful Interception System and which the at least one second interface comprises an X2 transport interface and a Handover Interface 2 (HI2).

15. A node for enhancing resolution of location information of a mobile user in an Evolved Packet Communication System, the node providing the mobile user with at least one tracking area in which the mobile user is able to move without location information being reported, the node, comprising:
    a processor; and
    memory including computer program code configured to, with the processor, cause the node to perform at least the following:
        receive a location activation message valid for the mobile user;
        receive a service request related to the mobile user;
        detect user location information with higher resolution than at least one tracking area level resolution; and
        provide a monitoring message comprising high resolution information of the user's location within the at least one tracking area.

16. The node according to claim 15, wherein the service request is a Non-Access Stratum (NAS) message.

17. The node according to claim 15, wherein the monitoring message is an Interception Related Information (IRI) Report.

18. The node according to claim 15, wherein the Evolved Packet Communication System further comprises a monitoring system that is attached to the node via at least one first interface and at least one second interface.

19. The node according to claim 18, wherein the location activation message is received from the monitoring system via the at least one first interface and the monitoring message is sent to the monitoring system via the at least one second interface.

20. The node according to claim 15, wherein the memory and the computer program code are further configured to, with the processor, cause the node to receive a tracking area list including the at least one tracking area.

* * * * *

UNITED STATES PATENT AND TRADEMARK OFFICE
CERTIFICATE OF CORRECTION

PATENT NO. : 8,274,932 B2
APPLICATION NO. : 12/714690
DATED : September 25, 2012
INVENTOR(S) : Iovieno et al.

It is certified that error appears in the above-identified patent and that said Letters Patent is hereby corrected as shown below:

On the Title Page

Item (57), under "ABSTRACT", in Column 2, Line 6, delete "reported," and insert -- reported. --, therefor.

Item (57), under "ABSTRACT", in Column 2, Line 9, delete "user." and insert -- user; --, therefor.

In the Specification

In Column 1, Line 38, delete "disconnection" and insert -- disconnection. --, therefor.

In Column 9, Line 19, delete "both)," and insert -- both)), --, therefor.

Signed and Sealed this
Eighth Day of October, 2013

Teresa Stanek Rea
*Deputy Director of the United States Patent and Trademark Office*